US008228236B2

(12) United States Patent
Birnbaum et al.

(10) Patent No.: US 8,228,236 B2
(45) Date of Patent: Jul. 24, 2012

(54) INVERTED F ANTENNA WITH COPLANAR FEED AND RFID DEVICE HAVING SAME

(75) Inventors: Thomas Birnbaum, Santa Cruz, CA (US); Sireesha Ramisetti, Sunnyvale, CA (US); Edmond Sardariani, San Jose, CA (US)

(73) Assignee: Intelleflex Corporation, Santa Clara, CA (US)

( * ) Notice: Subject to any disclaimer, the term of this patent is extended or adjusted under 35 U.S.C. 154(b) by 1053 days.

(21) Appl. No.: 11/847,152

(22) Filed: Aug. 29, 2007

(65) Prior Publication Data
US 2009/0058656 A1 Mar. 5, 2009

(51) Int. Cl.
H01Q 1/36 (2006.01)
H01Q 1/48 (2006.01)
H01Q 5/00 (2006.01)
H01Q 9/04 (2006.01)

(52) U.S. Cl. .............. 343/700 MS; 340/572.7; 343/845; 343/846; 343/866

(58) Field of Classification Search ............... 340/572.7; 343/700 MS, 702, 845, 846, 866
See application file for complete search history.

(56) References Cited

U.S. PATENT DOCUMENTS

| 5,995,048 | A | * | 11/1999 | Smithgall et al. ...... 343/700 MS |
| 6,075,707 | A | * | 6/2000 | Ferguson et al. ............. 361/750 |
| 6,118,379 | A | * | 9/2000 | Kodukula et al. .......... 340/572.8 |
| 6,278,369 | B2 | * | 8/2001 | Smith et al. ................. 340/572.7 |
| 6,340,932 | B1 | | 1/2002 | Rodgers et al. ............. 340/572.7 |
| 6,344,823 | B1 | | 2/2002 | Deng ............................. 343/700 |
| 7,058,434 | B2 | * | 6/2006 | Wang et al. ................. 455/575.7 |
| 7,183,976 | B2 | | 2/2007 | Wu et al. ........................ 343/700 |
| 7,183,994 | B2 | | 2/2007 | Weigand ....................... 343/795 |
| 7,408,512 | B1 | * | 8/2008 | Rodenbeck et al. ... 343/700 MS |
| 7,433,720 | B2 | * | 10/2008 | Seol ............................ 455/575.1 |
| 7,477,196 | B2 | * | 1/2009 | Asrani et al. ........... 343/700 MS |
| 2002/0075184 | A1 | * | 6/2002 | Tuttle ..................... 343/700 MS |
| 2005/0242964 | A1 | * | 11/2005 | Tuttle ......................... 340/572.8 |
| 2006/0017628 | A1 | | 1/2006 | Wu et al. ........................ 343/702 |
| 2006/0033664 | A1 | | 2/2006 | Soler Castany et al. ...... 343/700 |
| 2006/0109192 | A1 | | 5/2006 | Weigand ....................... 343/795 |
| 2006/0145927 | A1 | | 7/2006 | Choi et al. .................... 343/700 |

(Continued)

OTHER PUBLICATIONS

Choi, Wonkyu, H.W. Son, Junho Yeo, Jung Jae-young, Ji-Hoon Bae, Choi Gil Young, "Platform-insensitve antenna for RFID sensor tag in the UHF band," Antennas and Propagation Society International Symposium, Jun. 9-15, 2007, IEEE.*

(Continued)

Primary Examiner — Douglas W Owens
Assistant Examiner — Jennifer F Hu
(74) Attorney, Agent, or Firm — Zilka-Kotab, PC

(57) ABSTRACT

An RFID device according to one embodiment includes an inverted F antenna having an active portion, a ground plane spaced from the active portion, and a feed coupled to and coplanar with the active portion; and an RFID controller coupled to the feed. An inverted F antenna according to another embodiment includes a substrate for an RFID device; an active portion coupled to the substrate; a ground plane spaced from the active portion; and a feed coupled to and coplanar with the active portion. An inverted F antenna according to yet another embodiment includes an active portion coupled to the substrate; a ground plane spaced from the active portion; a feed coupled to and coplanar with the active portion; and an extension portion being selectively coupleable to the active portion for altering a wavelength of the inverted F antenna.

11 Claims, 4 Drawing Sheets

U.S. PATENT DOCUMENTS

| | | | |
|---|---|---|---|
| 2006/0256018 A1 | 11/2006 | Soler Castany et al. | 343/700 |
| 2007/0001925 A1 | 1/2007 | Bae et al. | 343/895 |
| 2007/0013589 A1 | 1/2007 | Park et al. | 343/702 |
| 2007/0046543 A1 | 3/2007 | Choi et al. | 343/700 |
| 2007/0096988 A1 | 5/2007 | Parsche et al. | 343/700 |
| 2007/0103311 A1 | 5/2007 | Kippelen et al. | 340/572.8 |
| 2007/0149146 A1* | 6/2007 | Hwang et al. | 455/80 |
| 2007/0159399 A1 | 7/2007 | Perunka et al. | 343/700 |
| 2007/0164868 A1 | 7/2007 | Deavours et al. | 340/572.7 |
| 2007/0229279 A1* | 10/2007 | Yamazaki et al. | 340/572.7 |
| 2009/0224056 A1* | 9/2009 | Kwon, II | 235/492 |

OTHER PUBLICATIONS

Choi et al., "A RFID Tag Using a Planar Inverted-F Antenna Capable of Being Stuck to Metallic Objects" ETRI Journal, col. 28, No. 2, Apr. 2006 pp. 216-218.

International Search Report and Written Opinion from PCT Application No. PCT/US08/10081 mailed on Nov. 13, 2008.

International Preliminary Report on Patentability from PCT Application No. PCT/US2008/010081 mailed on Mar. 11, 2010.

* cited by examiner

INVERTED F ANTENNA WITH COPLANAR FEED AND RFID DEVICE HAVING SAME

FIELD OF THE INVENTION

The present invention relates to inverted F Radio Frequency (RF) antennas, and more particularly, this invention relates to inverted F antennas and RFID devices.

BACKGROUND OF THE INVENTION

The use of RFID tags are quickly gaining popularity for use in the monitoring and tracking of an item. RFID technology allows a user to remotely store and retrieve data in connection with an item utilizing a small, unobtrusive tag. As an RFID tag operates in the radio frequency (RF) portion of the electromagnetic spectrum, an electromagnetic or electrostatic coupling can occur between an RFID tag affixed to an item and an RFID tag reader. This coupling is advantageous, as it precludes the need for a direct contact or line of sight connection between the tag and the reader.

Inverted F antennas have been used in wireless communications systems including mobile telephones, pagers, Global Positioning System (GPS), wireless LAN, WiFi, aircraft, locomotives, vehicles, radiolocation devices etc. Inverted-F antennas typically include a linear (i.e., straight) conductive element, e.g. a wire, that is maintained in spaced apart relationship with respect to a ground plane. They are especially useful where a low profile antenna is needed, one that does not stand tall above communications device, or mobile platform.

However, inverted F antennas have rarely if ever been implemented in RFID devices. This may be due to the standard configuration in which the feed line to the radiating element traverses the ground plane. Further, most inverted-F antennas are designed to match a 50 Ohm impedance, meaning that they will not function optimally if matched to an impedance that is not standard, e.g., 50 Ohms.

What is therefore needed is new design for inverted F antennas, as well as RFID devices implementing them.

SUMMARY OF THE INVENTION

An RFID device according to one embodiment includes an inverted F antenna having an active portion, a ground plane spaced from the active portion, and a feed coupled to and coplanar with the active portion; and an RFID controller coupled to the feed.

An inverted F antenna according to another embodiment includes a substrate for an RFID device; an active portion coupled to the substrate; a ground plane spaced from the active portion; and a feed coupled to and coplanar with the active portion.

An inverted F antenna according to yet another embodiment includes an active portion coupled to die substrate; a ground plane spaced from the active portion; a feed coupled to and coplanar with the active portion; and an extension portion being selectively coupleable to the active portion for altering a wavelength of the inverted F antenna.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

Figure 1:
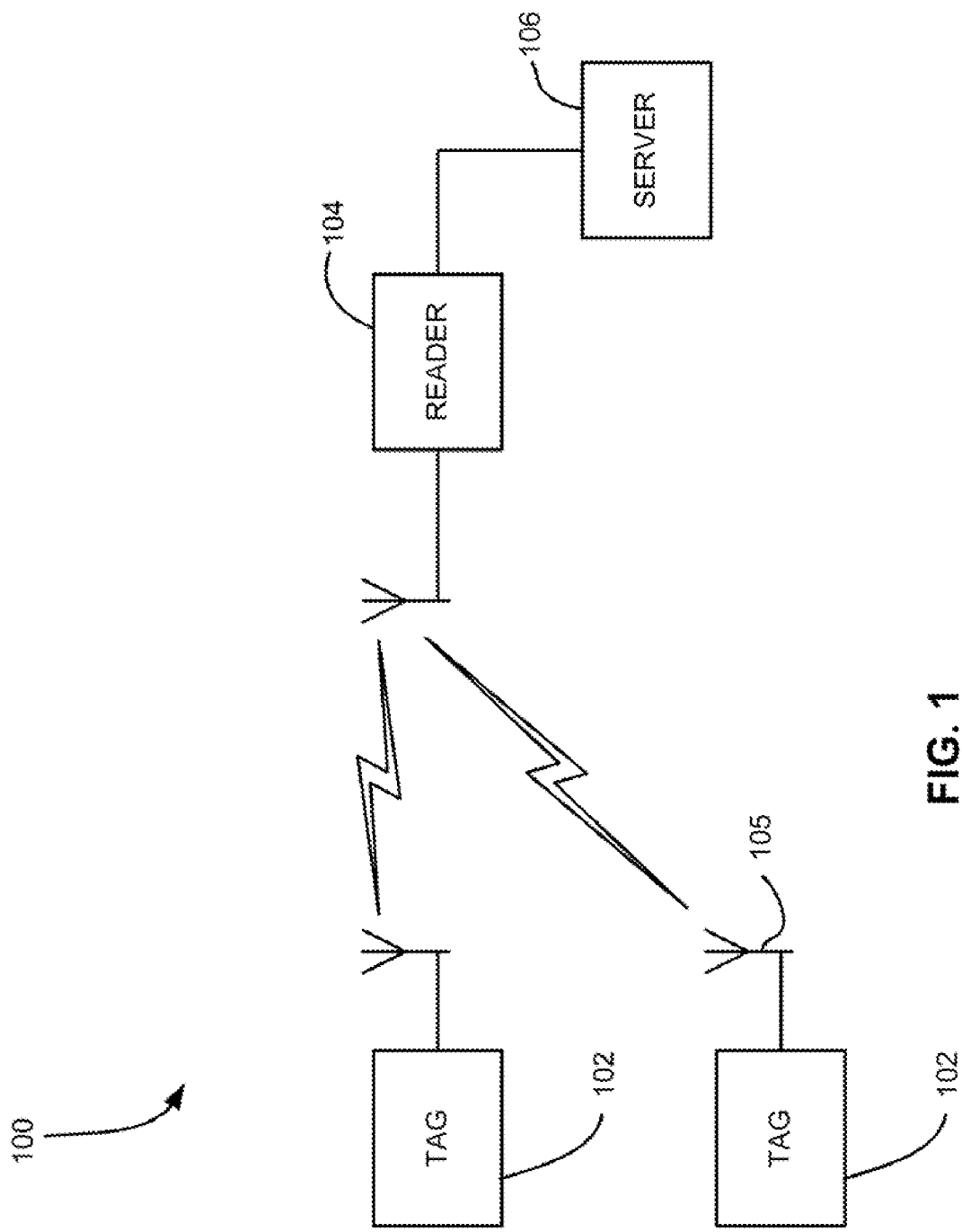
FIG. 1 is a system diagram of an RFID system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

In the drawings, like and equivalent elements are numbered the same throughout the various figures.

FIG. 1 depicts an RFID system 100 according to one of the various embodiments, which may include some or all of the following components and/or other components. As shown in FIG. 1, one or more RFID devices 102 are present. Each RFID device 102 in this embodiment includes a controller and memory, which are preferably embodied on a single chip as described below, but may also or alternatively include a different type of controller, such as an application specific integrated circuit (ASIC), processor, an external memory module, etc. For purposes of the present discussion, the RFID devices 102 will be described as including a chip. Each RFID device 102 may further include or be coupled to an antenna 105.

An illustrative chip is disclosed below, though actual implementations may vary depending on how the device is to be used. In general terms, a preferred chip includes one or more of a power supply circuit to extract and regulate power from the RF reader signal; a detector to decode signals from the reader; a backscatter modulator, a transmitter to send data back to the reader; anti-collision protocol circuits; and at least enough memory to store its unique identification code, e.g., Electronic Product Code (EPC).

While RFID devices 102 according to some embodiments are functional RFID tags, other types of RFID devices 102 include merely a controller with on-board memory, a controller and external memory, etc.

Each of the RFID devices 102 may be coupled to an object or item, such as an article of manufacture, a container, a device, a person, etc.

With continued reference to FIG. 1, a remote device 104 such as an interrogator or "reader" communicates with the RFID devices 102 via an air interface, preferably using standard RFID protocols. An "air interface" refers to any type of wireless communications mechanism, such as the radio-frequency signal between the RFID device and the remote device. The RFID device 102 executes the computer commands that the RFID device 102 receives from the reader 104.

The system 100 may also include an optional backend system such as a server 106, which may include databases containing information and/or instructions relating to RFID tags and/or tagged items.

As noted above, each RFID device 102 may be associated with a unique identifier. Such identifier is preferably an EPC code. The EPC is a simple, compact identifier that uniquely identifies objects (items, cases, pallets, locations, etc.) in the supply chain. The EPC is built around a basic hierarchical idea that can be used to express a wide variety of different, existing numbering systems, like the EAN.UCC System Keys, UID, VIN, and other numbering systems. Like many current numbering schemes used in commerce, the EPC is divided into numbers that identify the manufacturer and product type. In addition, the EPC uses an extra set of digits, a serial number, to identify unique items. A typical EPC number contains:

1. Header, which identifies the length, type, structure, version and generation of EPC;
2. Manager Number, which identifies the company or company entity;
3. Object Class, similar to a stock keeping unit or SKU; and
4. Serial Number, which is the specific instance of the Object Class being tagged.

Additional fields may also be used as part of the EPC in order to properly encode and decode information from different numbering systems into their native (human-readable) forms.

Each RFID device 102 may also store information about the item to which coupled, including but not limited to a name or type of item, serial number of the item, date of manufacture, place of manufacture, owner identification, origin and/or destination information, expiration date, composition, information relating to or assigned by governmental agencies and regulations, etc. Furthermore, data relating to an item can be stored in one or more databases linked to the RFID tag. These databases do not reside on the tag, but rather are linked to the tag through a unique identifier(s) or reference key(s).

RFID systems may use reflected or "backscattered" radio frequency (RF) waves to transmit information from the RFID device 102 to the remote device 104, e.g., reader. Since passive (Class-1 and Class-2) tags get all of their power from the reader signal, the tags are only powered when in the beam of the reader 104.

The Auto ID Center EPC-Compliant tag classes are set forth below:
  Class-1
   Identity tags (RF user programmable, range ~3 m)
   Lowest cost
  Class-2
   Memory tags (20 bit address space programmable at ~3 m range)
   Security & privacy protection
   Low cost
  Class-3
   Semi-passive tags (also called semi-active tags and battery assisted passive (BAP) tags)
   Battery tags (256 bits to 2M words)
   Self-Powered Backscatter (internal clock, sensor interface support)
   ~100 meter range
   Moderate cost
  Class-4
   Active tags
   Active transmission (permits tag-speaks-first operating modes)
   ~30,000 meter range
   Higher cost In RFID systems where passive receivers (i.e., Class-1 and Class-2 tags) are able to capture enough energy from the transmitted RF to power the device, no batteries are necessary. In systems where distance prevents powering a device in this manner, an alternative power source must be used. For these "alternate" systems (e.g., semi-active, semi-passive or battery-assisted), batteries are the most common form of power. This greatly increases read range, and the reliability of tag reads, because the tag does not need power from the reader to respond. Class-3 tags only need a 5 mV signal from the reader in comparison to the 500 mV that Class-1 and Class-2 tags typically need to operate. This 100:1 reduction in power requirement along with the reader's ability to sense a very small backscattered signal permits Class-3 tags to operate out to a free space distance of 100 meters or more compared with a Class-1 range of only about 3 meters. Note that semi-passive and active tags with built in passive mode may also operate in passive mode, using only energy captured from an incoming RF signal to operate and respond, at a shorter distance up to 3 meters.

Active, semi-passive and passive RFID tags may operate within various regions of the radio frequency spectrum. Low-frequency (30 KHz to 500 KHz) tags have low system costs and are limited to short reading ranges. Low frequency tags may be used in security access and animal identification applications for example. Ultra high-frequency (860 MHz to 960 MHz and 2.4 GHz to 2.5 GHz) tags offer increased read ranges and high reading speeds.

Figure 2:
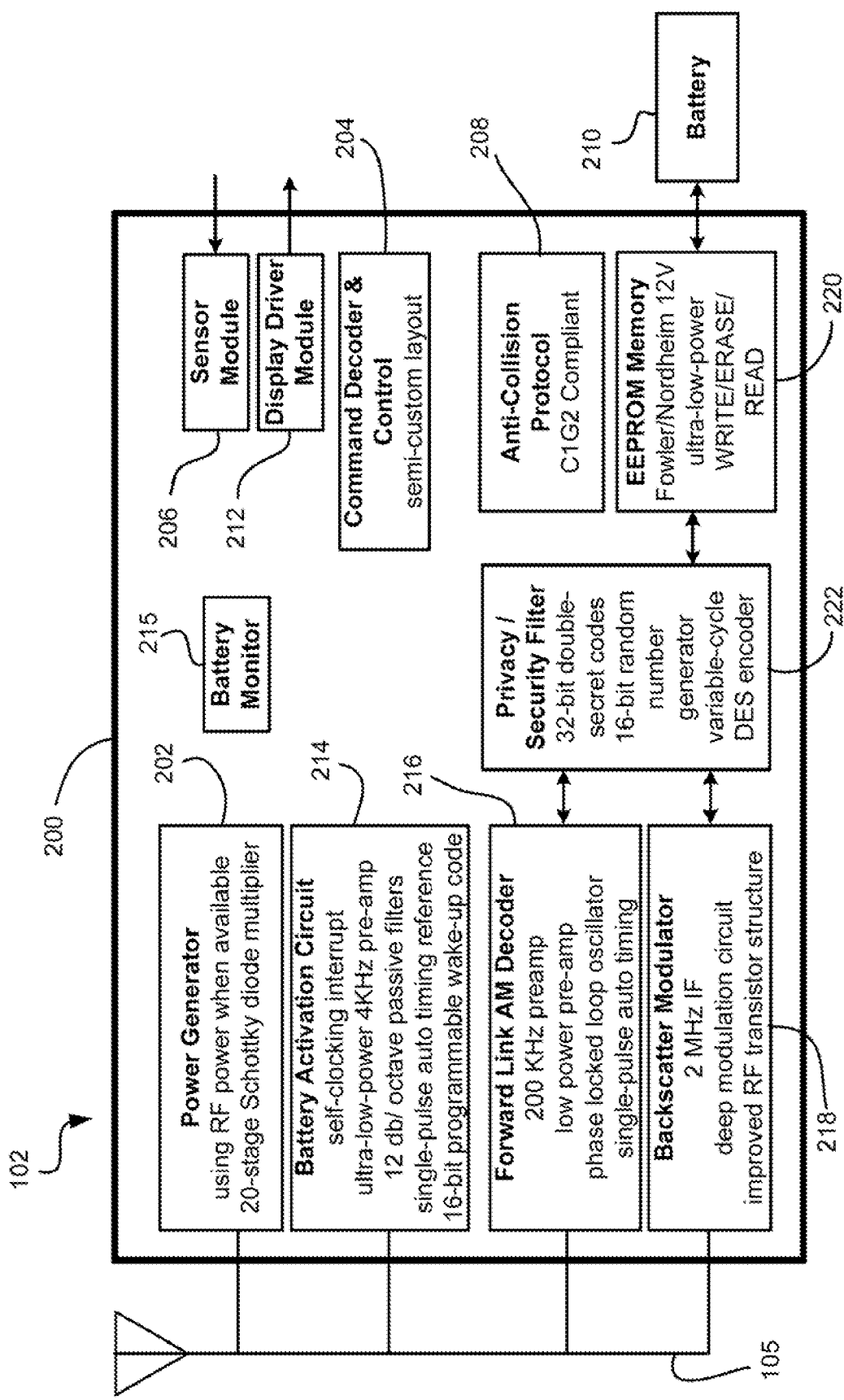
FIG. 2 is a system diagram for an integrated circuit (IC) chip for implementation in an RFID device.

A basic RFID communication between an RFID device and a remote device typically begins with the remote device, e.g., reader, sending out signals via radio wave to find a particular RFID device, e.g., tag via singulation or any other method known in the art. The radio wave hits the RFID device, and the RFID device recognizes the remote Embodiments of the RFID device are preferably implemented in conjunction with a Class-3 or higher Class IC chip, which typically contains the processing and control circuitry for most if not all tag operations. FIG. 2 depicts a circuit layout of a Class-3 IC 200 and the various control circuitry according to an illustrative embodiment for implementation in an RFID tag 102. It should be kept in mind that the present invention can be implemented using any type of RFID device, and the circuit 200 is presented as only one possible implementation.

The Class-3 IC of FIG. 2 can form the core of RFID chips appropriate for many applications such as identification of pallets, cartons, containers, vehicles, or anything where a range of more than 2-3 meters is desired. As shown, the chip 200 includes several circuits including a power generation and regulation circuit 202, a digital command decoder and control circuit 204, a sensor interface module 206, a C1G2 interface protocol circuit 208, and a power source (battery) 210. A display driver module 212 can be added to drive a display.

A forward link AM decoder 216 uses a simplified phase-lock-loop oscillator that requires only a small amount of chip area. Preferably, the circuit 216 requires only a minimum string of reference pulses.

A backscatter modulator block 218 preferably increases the backscatter modulation depth to more than 50%.

A memory cell, e.g., EEPROM, is also present, and preferably has a capacity from several kilobytes to one megabyte or more. In one embodiment, a pure, Fowler-Nordheim direct-tunneling-through-oxide mechanism 220 is present to reduce both the WRITE and ERASE currents to about 2 µA/cell in the EEPROM memory array. Unlike any RFID tags built to date, this permits reliable tag operation at maximum range even when WRITE and ERASE operations are being performed. In other embodiments, the WRITE and ERASE currents may be higher or lower, depending on the type of memory used and its requirements.

Preferably, the amount of memory available on the chip or otherwise is adequate to store data such that the external device need not be in active communication with the remote device.

The module 200 may also incorporate a security encryption circuit 222 for operating under one or more security schemes, secret handshakes with readers, etc.

The RFID device may have a dedicated power supply, e.g. battery; may draw power from a power source of the electronic device (e.g., battery, AC adapter, etc.); or both. Further, the RFID device may include a supplemental power source. Note that while the present description refers to a "supplemental" power source, the supplemental power source may indeed be the sole device that captures energy from outside the tag, be it from solar, RF, kinetic, etc. energy.

In one general embodiment, the antenna is an inverted F antenna (which is intended to include variations such as the planar inverted F antenna). The unique polarization pattern provides excellent reliability and range in highly reflective material-surrounded indoor and outdoor environments. Further, the inverted F antenna resonates within a narrower frequency band, as compared with other types of antennas, such as helices, monopoles and dipoles.

Figure 3A:
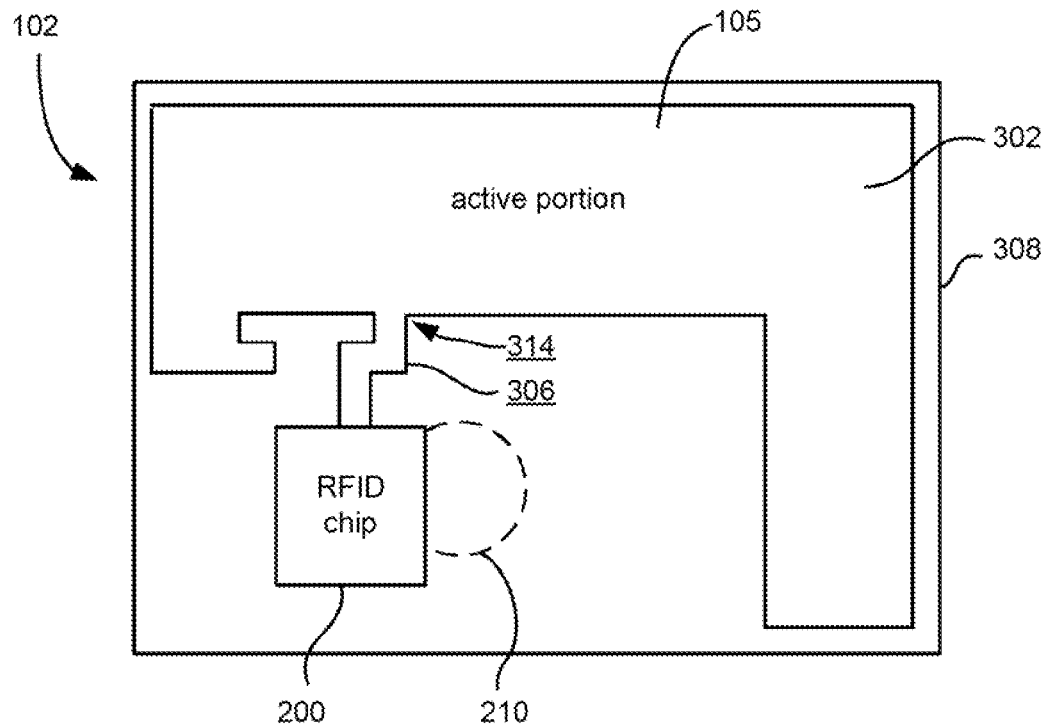
FIG. 3A is a top view of an RFID device according to one embodiment of the present invention.
Figure 3B:
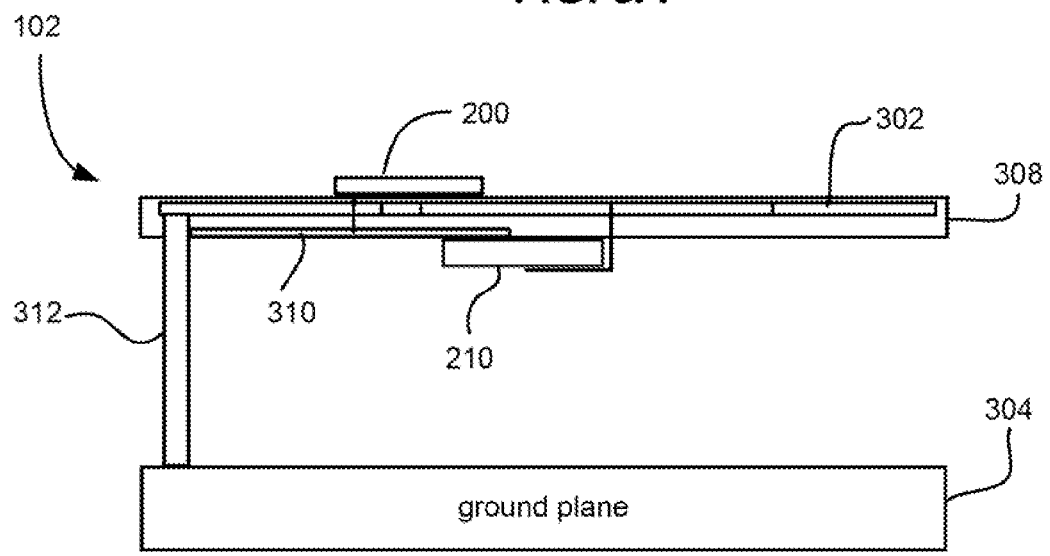
FIG. 3B is a side view of the RFID device of FIG. 3A.

FIGS. 3A and 3B depict a top and a side view, respectively, of an illustrative RFID device 102. As shown, the RFID device 102 includes an inverted F antenna 105 having an active portion 302, a ground plane 304 spaced from the active portion 302, and a feed 306 coupled to, and coplanar with, the active portion 302. An RFID controller 200 is coupled to the feed 306. In operation, the controller 200 provides a signal to the feed, which excites the active portion 302, thereby generating an RF signal.

The active portion 302 may be formed on or in a substrate 308 such as a printed circuit board, etc. The substrate 308 may also then act as a support to other device components such as the controller 200. Further, the substrate 308 may support or contain the various circuitry and connections needed for proper operation of the device.

In this embodiment, the active portion 302 and ground plane 304 lie on parallel planes. In other embodiments, the planes on which the active portion 302 and ground plane 304 lie might intersect. While any dielectric material can be interposed between the active portion 302 and the ground plane 304, e.g., plastic, Styrofoam, etc., the preferred material is air. An air dielectric is best from an energy efficiency standpoint, with the antenna size being about a quarter of wavelength at the center of the operating frequency band. Other dielectrics can shorten the antenna, but may result in lower efficiency and narrower bandwidths.

The active portion 302 may be of standard construction known in the art. Typical materials that may be used to construct the active portion 302 are copper, gold, silver, etc. In general, the overall length of the inverted F antenna (height plus length) is approximately one-quarter wavelength at the resonant frequency. Adjustment of the width of the active portion 302 and/or the conductive member 312 affects the bandwidth of the inverted F antenna, with bandwidth increasing as the width(s) is/are increased.

The ground plane 304 may be of a standard construction known in the art. In one approach, the ground plane 304 is formed of a continuous sheet of metal formed in or on a suitable substrate 308, such as a printed circuit board, etc. Preferably, the ground plane 304 has similar extents in directions parallel to its plane as the active portion 302, which makes it possible to achieve small form factors without compromising antenna performance. In particularly preferred embodiments, the substrate 308 extends to, or slightly beyond, outer edges of the active portion 302 (as shown in FIG. 3A), while the ground plane 304 has similar dimensions as the substrate 308 (as shown in FIG. 3B). In other approaches, the ground plane extends beyond, and sometimes even significantly beyond, the extents as the active portion 302. Though the ground plane may have larger dimensions, the antenna functions in substantially the same manner. Note that these dimensions refer primarily to length and width, not thickness in a direction perpendicular to the overall plane thereof.

A preferably vertical conductive member 312 provides an electrical bridge between the active portion 302 and the ground plane 304. In one embodiment, the conductive member 312 has a height that is a small fraction of the wavelength (e.g., 2-4%) and is coupled to the active portion 302 along one side thereof. The inverted F antenna thus presents a low profile, resulting in a compact transponder module. The feedpoint 314 is displaced from the conductive member 312 by a predetermined distance. Adjustment of the location of the feedpoint 314 relative to the conductive member 312 and the active portion 302 allows the inverted F antenna to be tuned or partially tuned. That is, the antenna is tapped at a distance from the base to provide a desired driving point impedance. Thus, any impedance level may be obtained by adjusting various parameters of the tap position and geometry. As discussed below, this may be important for matching the impedance of the controller 200.

As noted above, the feed 306 is coplanar to the active portion 302. Preferably the feed 306 is coplanar to the active portion 302 for a full extent of the feed 306, i.e., from the coupling to the antenna portion to the lead connecting the feed 306 to the controller 200.

In one approach, the coplanar feed 306 is of continuous construction with the active portion 302. For example, the feed 306 may be formed concurrently with the active portion 302. The feed 306 may even be of the same material as the active portion 302. In other embodiments, the feed 306 may be formed in a different processing step than formation of the active portion 302.

In embodiments where the RFID device is an active or semi-active device, a battery 210 or other power source may be coupled to the controller 200. In the embodiment shown, the battery is positioned on a plane located between the active portion 302 and the ground plane 304, though other positions are contemplated. The substrate 308 may include a ground portion 310 for coupling to a terminal of a battery, e.g., via direct engagement thereof. As shown in FIG. 3B, the ground portion 310 is preferably in electrical communication with the ground plane 304. One way to do this is to couple the ground portion 310 to the conductive member 312 via a printed trace, a conductor, etc. Another way is to design the ground portion 310 to extend to the conductive member 312. Circuitry in the substrate 308, e.g., a conductive lead or via, connects the ground portion 310 to the controller 200. Another lead may connect the other battery terminal to the controller 200. It should also be pointed out that the ground portion 310 can also serve any RF grounding needs.

One terminal of the battery, e.g., the negative terminal, may be in direct electrical communication with the antenna ground plane 304. For instance, in embodiments having a ground portion 310 on the substrate 308, the ground portion 310 may connect to the conductive member 312 coupling the active portion 302 to the ground plane 304. In other embodiments, a simple lead may be used.

The design of the inverted F antenna is not narrowly critical. In one approach, the antenna may be designed to match an impedance of the controller 200. Particularly, the antenna may be matched to an arbitrary impedance, e.g., the impedance of an RFID chip to be used with the antenna. The required impedance bandwidth may be achieved by adjusting variables, such as the feedpoint 314, the width of the conductive member 312 that connects the active portion 302 to the ground plane 304, the shape and/or dimensions of the active portion 302, etc. Computer modeling of antenna designs based on the teachings presented herein may be used to assist in selection of the feed 306 position, width of the conductive member 312, and other variables for a particular implementation.

In another approach, the antenna may be designed to an impedance of general use, e.g., 50 ohms.

In embodiments that include a battery, the design should take into account the effects of the battery on antenna performance. Again, computer modeling may be used to facilitate design.

In one embodiment, designed to be operated at a frequency of 915 MHz, the spacing between the active portion 302 and the ground plane 304 is about 8 mm, the width of the active portion 302 is about 12 mm in the wide portion and about 8 mm in the narrow portion, and the length of the active portion 302 is about 84 mm.

Figure 4A:
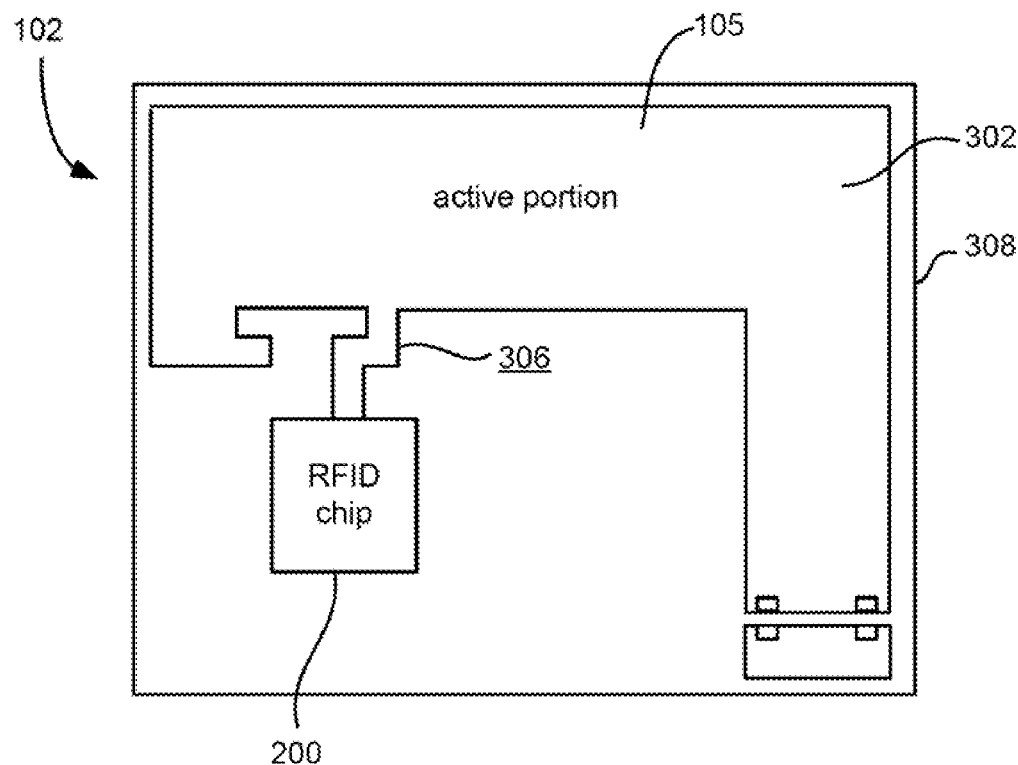
FIG. 4A is a top view of an RFID device according to one embodiment of the present invention.

FIG. 4A illustrates an embodiment which includes an extension portion 402 that is selectively coupleable to the active portion 302 for altering a wavelength of the inverted F antenna, and thus the frequency of the emitted signal. The ability to select the antenna length is useful, for instance where it is desirable to create a tag that may be ultimately used in one of two different regulatory environments, e.g., United States or Europe.

In one approach, the extension portion 402 is formed concurrently with the active portion 302, yet electrically isolated therefrom. If the tag is to be used in a regulatory environment where the length of the active portion 302 is appropriate, no connection is made. If the tag is to be used in a regulatory environment where the length of the active portion 302 is insufficient, the extension portion 402 can be simply coupled thereto by any suitable mechanism, e.g., a zero-ohm resistor, solder, wire, etc. Accordingly, a single antenna need be manufactured for multiple regulatory environments, greatly reducing costs by eliminating the need to separately design and fabricate a different antenna (or portion thereof) for each regulatory environment.

Figure 4B:
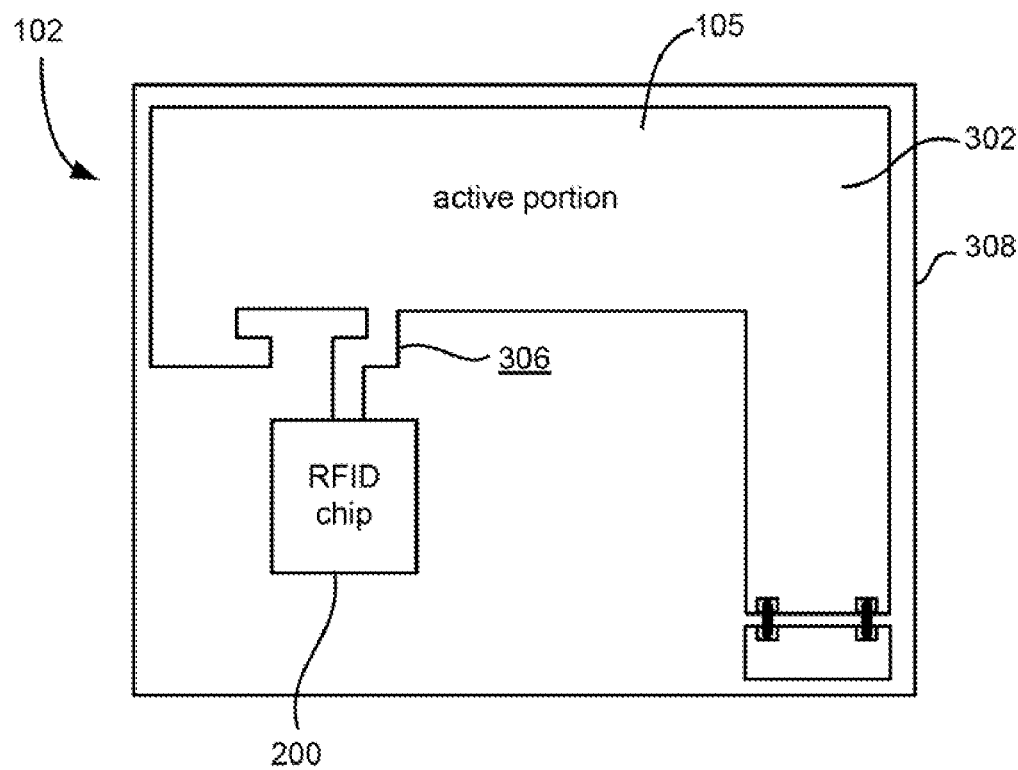
FIG. 4B is a top view of the RFID device of FIG. 4A with the extension portion coupled to the active portion.

In FIG. 4A, the extension portion 402 is not coupled to the active portion 302. In FIG. 4B, the extension portion 402 is coupled to the active portion 302.

Inverted F antennas constructed according to the teachings presented herein provide excellent performance when mounted on or near an electrically conductive surface and/or RF reflective surface, not just on or near nonconductive or nonreflective surfaces. In various embodiments, such an antenna will perform equally or better when positioned on or near a conductive and/or reflective surface than when positioned on or near a nonconductive and/or nonreflective surface.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A Radio Frequency Identification (RFID) device, comprising:
   an inverted F antenna having an active portion, a ground plane spaced from the active portion, and a feed coupled to and coplanar with the active portion;
   an RFID controller coupled to the feed;
   a battery coupled to the RFID controller and in direct electrical communication with the ground plane, wherein
   the RFID device is configured to respond to an interrogator using backscatter communication;
   wherein the active portion and the ground plane lie on parallel planes; wherein
   the battery is positioned on a plane located between the active portion and the ground plane; wherein
   the inverted F antenna is designed to match an impedance of the controller; wherein
   an extent of the ground plane in a direction parallel to its plane is greater than an extent of the active portion in a direction parallel thereto.

2. The RFID device as recited in claim 1, wherein the RFID device is a semi-active device.

3. The RFID device as recited in claim 1, wherein the RFID device is an active device.

4. The RFID device as recited in claim 1, wherein all portions of the active portion lie along a common plane.

5. The RFID device as recited in claim 1, wherein the feed is coplanar to the active portion for a full extent thereof.

6. The RFID device as recited in claim 1, wherein the feed is of continuous construction with the active portion.

7. The RFID device as recited in claim 1, further comprising an extension portion being selectively coupleable to the active portion for altering a wavelength of the inverted F antenna.

8. A Radio Frequency Identification (RFID) device, comprising:
   a substrate;
   an inverted F antenna having an active portion coupled to the substrate, a ground plane spaced from the active portion, and a feed coupled to and coplanar with the active portion, wherein the active portion and ground plane lie in parallel planes;
   a battery in direct electrical communication with the ground plane, and
   a controller coupled to the battery and the feed; wherein
   the substrate includes a ground portion for coupling to a terminal of the battery, wherein the ground portion is in electrical communication with the ground plane and is positioned on a plane located between the active portion and the ground plane, and the ground portion electrically connects the battery to the ground plane, wherein
   the RFID device is configured to respond to an interrogator using backscatter communication;
   the inverted F antenna is designed to match an impedance of the controller, and
   an extent of the ground plane in a direction parallel to its plane is greater than an extent of the active portion in a direction parallel thereto.

9. The RFID device as recited in claim 8, wherein the feed is coplanar to the active portion for a full extent thereof.

10. The RFID device as recited in claim 8, wherein the feed is of continuous construction with the active portion.

11. The RFID device as recited in claim 8, further comprising an extension portion being selectively coupleable to the active portion for altering a wavelength of the inverted F antenna.

* * * * *

UNITED STATES PATENT AND TRADEMARK OFFICE
CERTIFICATE OF CORRECTION

PATENT NO.        : 8,228,236 B2
APPLICATION NO.   : 11/847152
DATED             : July 24, 2012
INVENTOR(S)       : Birnbaum et al.

Page 1 of 1

It is certified that error appears in the above-identified patent and that said Letters Patent is hereby corrected as shown below:

In the specification:

col. 1, line 53 replace "die" with --the--.

Signed and Sealed this
Second Day of October, 2012

David J. Kappos
*Director of the United States Patent and Trademark Office*